United States Patent [19]
Sticht

[11] Patent Number: 4,588,069
[45] Date of Patent: May 13, 1986

[54] APPARATUS FOR SINGLING ASSEMBLY PARTS

[76] Inventor: Walter Sticht, Karl-Heinrich-Waggerl-Strasse 8, Attnang-Puchheim A-4800, Austria

[21] Appl. No.: 786,153

[22] Filed: Oct. 8, 1985

Related U.S. Application Data

[63] Continuation of Ser. No. 659,040, Oct. 10, 1984, abandoned, which is a continuation of Ser. No. 591,899, Mar. 21, 1984, abandoned, which is a continuation of Ser. No. 306,096, Sep. 25, 1981, abandoned.

[30] Foreign Application Priority Data

Sep. 30, 1980 [AT] Austria ............................... 4864/80

[51] Int. Cl.⁴ ............................................. B65G 47/12
[52] U.S. Cl. .................................. 198/443; 198/533; 198/953; 221/204
[58] Field of Search ............... 198/953, 382, 396, 397, 198/443, 533; 414/116, 130; 221/163, 167, 168, 200, 204; 29/426.6

[56] References Cited

U.S. PATENT DOCUMENTS 2,810,467 10/1957 Bogaty .............................. 198/533
3,724,656  4/1973 Sterling ......................... 198/533 X
3,882,994  5/1975 Mecks et al. .................. 221/168 X
4,231,687 11/1980 Sticht ................................ 198/953

FOREIGN PATENT DOCUMENTS 695093  7/1940 Fed. Rep. of Germany ...... 198/533
2044233 10/1980 United Kingdom ................ 198/953

Primary Examiner—Joseph E. Valenza
Assistant Examiner—Jonathan D. Holmes
Attorney, Agent, or Firm—Kurt Kelman

[57] ABSTRACT

An apparatus for singling entangled assembly parts comprises a storage drum for receiving the assembly parts at random, two loosening devices for moving clusters of the entangled parts relative to a wall of the storage container, the loosening devices having entrainment elements for loosening and lifting a portion of the cluster, and an outlet for singled assembly parts.

8 Claims, 6 Drawing Figures

APPARATUS FOR SINGLING ASSEMBLY PARTS

This is a continuation of my application Ser. No. 659,040, filed Oct. 10, 1984, now abandoned which is a continuation of my application Ser. No. 591,899, filed Mar. 21, 1984, now abandoned, which is a continuation of my application Ser. No. 306,096, filed Sept. 25, 1981, now abandoned.

The invention relates to an apparatus for singling entangled or cohering assembly parts randomly arranged in a storage container, which comprises two loosening devices for moving clusters of the assembly parts relative to a housing wall, particularly of the storage container, and an outlet for the singled assembly parts.

U.S. Pat. No. 4,396,108 discloses an apparatus for singling assembly parts and equipped with a storage container for receiving a randomly arranged amount of the assembly parts. This storage container is a drum. Entrainment elements projecting inwardly towards the center of the drum are arranged on the inside of the drum wall and the drum is connected to a driving device. The drum may be rotated by this driving device about its horizontal axis. The cluster of assembly parts is entrained through a portion of the rotational path of the drum by the inwardly projecting entrainment elements when they pass through the lower portion of their path. The larger the cluster, the sooner it is released and glides or falls back in a direction opposite to that of the rotation, and is then engaged in a different supporting position by one of the succeeding entrainment elements and is again entrained thereby. The cluster is loosened by the lift imparted to it by the entrainment elements and is compressed again when it falls down. In this manner, the entangled assembly parts are moved relative to each other and this causes a loosening of the cluster. The singled assembly parts are then delivered through outlets arranged in the drum wall to a receiving device, for instance a gripping table or a succeeding conveyor device for orienting or classifying the parts.

Such known apparatus has been very successful in commercial operations but it has not been possible to obtain an equally high disentangling effect for assembly parts of all types.

It is an object of the present invention to construct an such apparatus so that the loosening of the entangled or coherent parts is improved so as to obtain a uniformly good and economical singling of entangled parts.

This object of the invention is obtained in an apparatus of the first-described type by both loosening devices comprising entrainment elements for loosening, lifting or conveying a portion of the cluster of the assembly parts and/or groups of assembly parts.

This surprisingly simple combination of features now makes it possible to single the portion of the cluster of assembly parts released from the cluster of assembly parts or the groups of two or more parts in two successive loosening stages. The singling of the parts with entrainment elements means that the parts in the clusters are moved relative to each other by the entrainment elements, and this movement is enhanced by the weight of the parts so that individual groups of parts or parts from the cluster or part groups are released. Since a further loosening stage for the complete singling of the parts immediately succeeds the division of the cluster of parts into partial clusters or groups of assembly parts, a succeeding compaction of the groups of assembly parts to clusters of assembly parts is advantageously avoided during the disentangling process. In this manner, a higher output of singled parts is frequently achieved, especially with very heavily entangled parts. Furthermore, jamming in the range of the outlet opening of the apparatus is avoided by loosening the cluster of assembly parts as well as the recurring groups of assembly parts formed in the apparatus. In apparatus with a device for orienting and classifying the parts succeeding the outlet of the apparatus, the portion of assembly parts which must be returned to the storage container is also reduced.

The entrainment elements may be formed by transverse webs arranged on an endless conveyor belt constituting one loosening device and a slide with a sliding drive, for example, a cylinder-piston arrangement, which is arranged in the outlet range of the storage container preceding the conveyor belt, constituting the other loosening device. Using transverse webs of an endless conveyor belt as entrainment elements makes it possible to utilize the conveyor belt simultaneously as a loosening device. The content of the storage container is divided into smaller groups of assembly parts by the combination of the loosening device constituted by the slide, which precedes the inlet range of the conveyor band, so that individual assembly parts may be stripped or received by the transverse webs from the clusters of assembly parts present in the range of the conveyor belt. At the same time, the slide prevents the groups of assembly parts from being turned around by the concurrent relative movement of the conveyor belt in the inlet range whereby a compaction of the entangled assembly parts in the inlet range of the conveyor belt is avoided.

It is within the scope of the invention to make the transverse webs partially rounded or recessed or to make them elastic in the conveying direction. This enables the number of parts to be entrained by a transverse web to be limited so that the parts cannot be entangled again on their way to the discharge point, and it is possible to disentangle even very sensitive parts with elastic transverse webs.

However, it is also within the scope of the invention to use single-row brushes or brush-like parts of synthetic resin foam as entrainment elements, which preferably have a cylindrical surface. With the ultilization of brush-like entrainment elements, on the moving conveyor belt, the individual assembly parts are brushed off the clusters of assembly parts so that the output efficiency of disentangled parts is multiplied.

It is, furthermore, advantageous to equip the storage container with a delivery chute to the conveyor belt and to arrange a slide plate in the bottom of the chute or a side wall thereof, which may be displaced substantially perpendicularly to the bottom of the chute with the sliding drive. The slide plate adjustable substantially perpendicularly to the bottom of the chute produces a strong stripping effect between the moving conveyor belt and the clusters of assembly parts moved about by the slide plate and, at the same time, excessive compaction of the assembly parts in the range of the conveyor belt is avoided.

Further advantages may be obtained in the apparatus according to the invention by a special construction of the slides and the sliding drives as well as the actuation thereof by the control device.

Finally, it is advantageously within the scope of the invention to arrange a sorting station, particularly a linear conveyor with baffles, between the loosening devices.

For a better understanding of the invention, it is hereinafter described in detail in connection with embodiments illustrated in the drawing wherein FIG. 1 shows an side elevational view of an apparatus for singling assembly parts;

Figure 1:
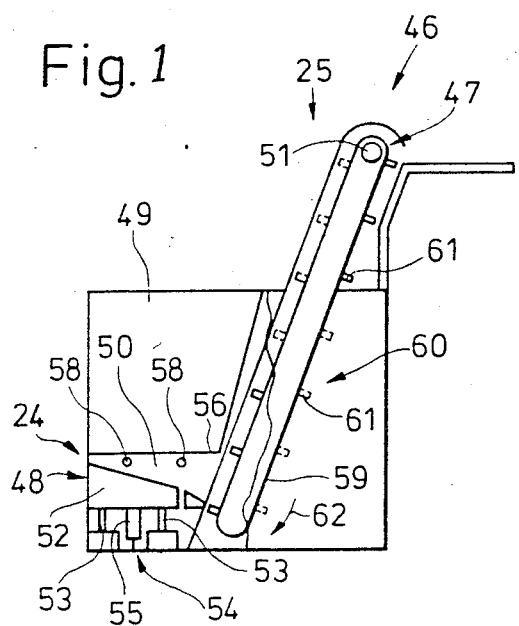
Figure 2:
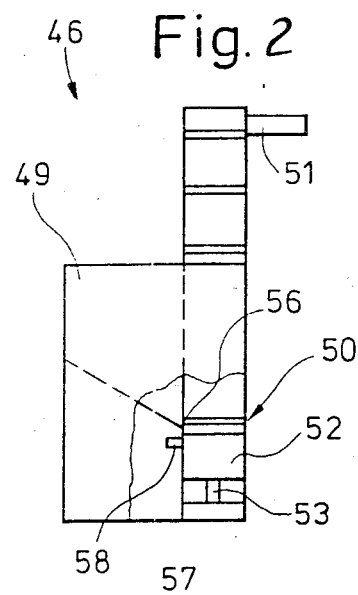
FIG. 2 is an end view of the apparatus of FIG. 1.

FIGS. 1 and 2 illustrate apparatus 46 for singling assembly parts, in which loosening device 25 is constituted by moving conveyor belt 47. Second loosening device 24 is constituted by slide 48. Apparatus 46 is equipped with storage container 49 opening into chute 50 into which the lower part of conveyor belt 47 extends and which is revolved by rotating drive 51. Sliding plate 52 guided vertically along two guide posts 53 is arranged in the range of the bottom of chute 50. Drive 54 for the slide is constituted by cylinder-piston arrangement 55. Sliding plate 52 may be raised by sliding drive 54 above upper edge 56 of side wall 57 of the chute. The vertical movement of the slide entrains the assembly parts received in chute 50 from storage container 49. Furthermore, air nozzles 58 may be arranged in side wall 57 of the chute.

The lower part of conveyor belt 47, on whose moving belt 59 transverse webs 61 constituting entrainment elements 60 are affixed, is arranged in the range of chute 50.

Figure 3:
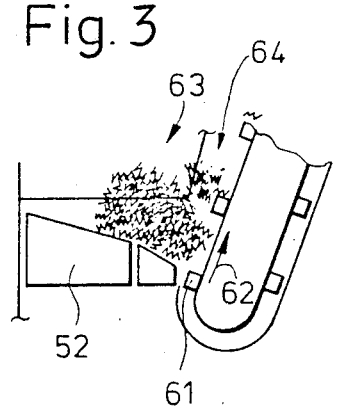
FIG. 3 is an enlarged side view of the transition range between the storage container and conveyor belt according to FIG. 1, with a cluster of assembly parts.

FIG. 3 shows how individual assembly parts are stripped from cluster 63 of the assembly parts stored in the chute and those resting on transverse webs 61 are conveyed upwardly to the discharge station by transverse webs 61 moving in the direction of arrow 62. To assure that cluster 63 of the assembly parts is also moved in the direction of the conveyor belt so as to make a stripping of additional parts possible, sliding drive 54 may raise sliding plate 52. Since sliding plate 52 is inclined in the direction of conveyor belt 47, the cluster of assembly parts is thereby caused to glide in the direction of the conveyor belt. This causes a certain pressure of the parts against the transverse webs so that single parts or singled assembly parts can be released from the cluster by the passing webs. The continuing sliding of the parts also causes the content of the storage container to be a little loosened due to the oscillating motion and it is avoided that groups 64 of assembly parts released from the cluster of the assembly parts begin to rotate due to the lifting motion exerted thereupon by the webs and to become reconnected to cluster 63 of the assembly parts by the passing of the transverse webs and a failure of cluster 63 of the assembly parts to be pressed thereagainst. The stored assembly parts are maintained in a loose condition by the loosening movement of sliding drive 54 which also prevents jamming of the parts which glide down from storage container 49 by periodically lifting the parts in the chute. This loosening movement may be additionally enhanced by the pulsating blowing of compressed air through air nozzles 58.

Figure 4:
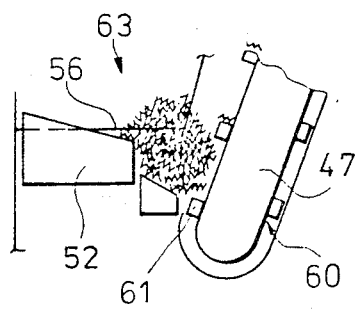
FIG. 4 is the same view, but showing the slide of the loosening device in raised position.

The raised position of sliding plate 52, wherein the largest portion is above upper edge 56 of the chute, is shown in FIG. 4. As shown, this causes cluster 63 of the parts to be moved in the direction of conveyor belt 47.

Entrainment elements 60 of loosening device 25, which are constituted by transverse webs 61, cause loosening because their shape or elastic arrangement on belt 59 effectuates a pulling apart of cluster 63 resting against conveyor belt 47. The individual assembly parts are released from the cluster because of this pulling and stripping effect and they are upwardly conveyed by the transverse webs. Mostly, groups of assembly parts are first released from the cluster of the assembly parts and they are resolved into single parts during the movement of the transverse webs along the side of the cluster. To prevent an entire group of assembly parts from being upwardly conveyed or too many singled parts from resting on a transverse web and becoming entangled again, the front longitudinal edge of the transverse webs is specially shaped.

Figure 5:
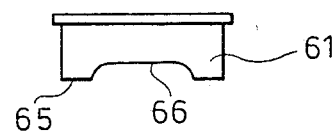
FIG. 5 is a top view of a transverse web of the conveyor belt of FIG. 1.

FIG. 5 shows that the entire effective length of this longitudinal edge 65 is reduced by recessed portion 66 so that the area with which parts are released from the cluster is smaller.

Figure 6:
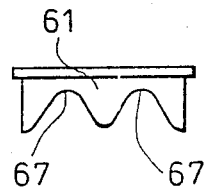
FIG. 6 shows another embodiment of a transverse web for a conveyor belt according to FIG. 1.

According to FIG. 6, the transverse web may have two recessed portions 67 to effectuate a stripping movement in several separated ranges of the cluster. The three teeth-like projecting points operate like a rake or a brush and thus comb single assembly parts or single groups of assembly parts out of the cluster of the assembly parts.

It is within the scope of the invention to use brushes with a cylindrical surface as transverse webs. On the other hand, single-row or multiple-row linear brushes may also be utilized for this purpose. The number of brush hairs and the material thereof, as well as their stiffness, may conform to prevailing requirements and the assembly parts to be singled.

Finally, it is also within the scope of the invention to constitute the entrainment elements of conveyor belt 47 as stationary or concurrently moving electromagnets or vacuum suction devices. The release of the part from the conveyor belt could then be effectuated by deenergizing the magnets or the vacuum devices, or by actuating them to reverse the effect. Of course, the resolving principle of the invention is universally applicable by matching the shape and arrangement of the entrainment elements with all different types of entangled parts, such as, for example, contact plates, electronic parts, sheet metal stampings or the like.

The control of conveyor belt 47 may also be effected in predetermined timed intervals, manually or fully automatically. The operation of the apparatus may be actuated in response to signals emitted from senders along the buffering path, for example when less than a minimum store of parts is present in this buffering path. When this desired amount has been restored, the apparatus may be fully automatically switched off.

I claim:

1. An apparatus for singling entangled assembly parts which comprises
    (a) a storage container for receiving a mass of randomly entangled assembly parts,
    (b) a chute laterally adjacent the storage container and the storage container opening into the chute whereby the chute receives clusters of the mass of entangled assembly parts from the storage container, the chute comprising a stationary portion having an edge forming an outlet and a slide portion arranged for sliding displacement substantially perpendicularly to the stationary chute portion and the storage container for moving respective ones of the received clusters of the entangled assembly parts relative to the stationary chute portion and the storage container, wherein a discharge edge of the storage container leading to an upper edge of the chute extends in a first direction and the chute extends in a second direction enclosing an angle with the first direction, the slide portion being downwardly inclined with respect to the discharge edge and being displaceable for sliding by the discharge edge of the storage container whereby the slide portion performs a shearing action with respect to the discharge edge of the storage container and separates respective ones of the clusters from the entangled assembly parts in the storage container, the slide portion thereby consitituting a first mechanical loosening device which lifts and loosens parts out of the clusters whereby the parts are at least partially disentangled, (c) a second mechanical loosening device, the second loosening device comprising a stationary conveyor belt support and a revolving conveyor belt mounted thereon and extending over the width of the stationary chute portion at the outlet edge thereof and a series of entrainment elements affixed to the conveyor belt, the outlet edge extending between the slide portion and the entrainment elements and leading to the entrainment elements on the conveyor belt, the entrainment elements being arranged to receive the at least partially disentangled assembly parts, the conveyor belt and entrainment elements loosening and lifting the parts whereby the parts are disentangled, and (d) the conveyor belt leading to an outlet for singled ones of said disentangled assembly parts.

2. The singling apparatus of claim 1, wherein the conveyor belt of the second mechanical loosening device is an upwardly moving conveyor belt, the entrainment elements being transverse webs arranged thereon.

3. The singling apparatus of claim 2, wherein the transverse webs have a longitudinal edge defining recesses therein.

4. The singling apparatus of claim 3, wherein the recesses are rounded.

5. The singling apparatus of claim 2, wherein the transverse webs are elastic.

6. The singling apparatus of claim 1, further comprising two guide columns supporting the displaceable slide portion, and a pneumatically operable cylinder-piston drive disposed centrally between the guide columns for displacing the slide portion.

7. The singling apparatus of claim 1, further comprising air nozzles arranged in the range of the slide portion for applying compressed air blasts to the assembly parts being lifted and loosened by the slide portion.

8. The singling apparatus of claim 1, wherein the slide portion has a front edge facing the conveyor belt and spaced from the entrainment elements thereof.

* * * * *